United States Patent
Kwon et al.

(10) Patent No.: US 11,488,777 B2
(45) Date of Patent: Nov. 1, 2022

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Byeong Chan Kwon, Suwon-si (KR); Ji Hun Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 21 days.

(21) Appl. No.: 17/237,166

(22) Filed: Apr. 22, 2021

(65) Prior Publication Data

US 2022/0181083 A1   Jun. 9, 2022

(30) Foreign Application Priority Data

Dec. 7, 2020 (KR) .................. 10-2020-0169232

(51) Int. Cl.
*H01G 4/30* (2006.01)
*H01G 4/224* (2006.01)
*H01G 4/12* (2006.01)

(52) U.S. Cl.
CPC .......... *H01G 4/224* (2013.01); *H01G 4/1227* (2013.01); *H01G 4/30* (2013.01); *H01G 4/308* (2013.01)

(58) Field of Classification Search
None
See application file for complete search history.

(56) References Cited

U.S. PATENT DOCUMENTS

| | | | | |
|---|---|---|---|---|
| 10,622,155 | B2* | 4/2020 | Choe | H01G 4/30 |
| 10,636,569 | B2* | 4/2020 | Kwon | H01G 4/30 |
| 10,903,006 | B2* | 1/2021 | Cha | H01G 2/065 |
| 11,276,526 | B2* | 3/2022 | Kang | H01G 4/30 |
| 2012/0262840 | A1* | 10/2012 | Koizumi | H01G 4/12 |
| | | | | 361/321.2 |
| 2016/0196918 | A1* | 7/2016 | Hong | H01G 4/232 |
| | | | | 361/301.4 |
| 2016/0293331 | A1* | 10/2016 | Kitamura | H01G 4/232 |
| 2016/0293332 | A1* | 10/2016 | Kato | H01G 4/12 |

(Continued)

FOREIGN PATENT DOCUMENTS

| CN | 106024380 A | * 10/2016 | .......... H01G 4/0085 |
|---|---|---|---|
| CN | 106935403 A | * 7/2017 | ............. H01G 4/008 |

(Continued)

*Primary Examiner* — Dion R. Ferguson
(74) *Attorney, Agent, or Firm* — Morgan, Lewis & Bockius LLP

(57) ABSTRACT

A multilayer ceramic electronic component includes a ceramic body including a dielectric layer and first and second internal electrodes, a first external electrode connected to the first internal electrode, and a second external electrode connected to the second internal electrode. The ceramic body includes a capacitance formation portion having first and a second surfaces opposing each other in a first direction, third and fourth surfaces opposing each other in a second direction, and fifth and sixth surfaces opposing each other in a third direction, the ceramic body including a first margin portion disposed on the third and fifth surfaces and a second margin portion disposed on the fourth and sixth surfaces.

34 Claims, 14 Drawing Sheets

(56) References Cited

U.S. PATENT DOCUMENTS

| | | | |
|---|---|---|---|
| 2019/0180936 A1* | 6/2019 | Cha | H01G 4/228 |
| 2020/0035415 A1* | 1/2020 | Kwon | H01G 4/224 |
| 2020/0058447 A1* | 2/2020 | Choe | H01G 4/005 |
| 2020/0075259 A1* | 3/2020 | Park | H01G 4/30 |
| 2020/0118760 A1* | 4/2020 | Jun | H01G 4/30 |
| 2021/0057157 A1* | 2/2021 | Lee | H01G 4/1227 |
| 2021/0193389 A1* | 6/2021 | Kim | H01G 13/00 |
| 2022/0102077 A1* | 3/2022 | Kitahara | H01G 4/0085 |
| 2022/0122770 A1* | 4/2022 | Jung | H01G 4/12 |
| 2022/0148811 A1* | 5/2022 | Kwon | H01G 4/008 |
| 2022/0181083 A1* | 6/2022 | Kwon | H01G 4/308 |

FOREIGN PATENT DOCUMENTS

| | | | | |
|---|---|---|---|---|
| JP | H06-349669 A | 12/1994 | | |
| JP | H09-320887 A | 12/1997 | | |
| JP | 2017-011172 A | 1/2017 | | |
| JP | 2019201166 A * | 11/2019 | | H01G 13/00 |

* cited by examiner

A

B

MULTILAYER CERAMIC ELECTRONIC COMPONENT AND METHOD OF MANUFACTURING THE SAME

CROSS-REFERENCE TO RELATED APPLICATION(S)

This application claims the benefit under 35 USC 119 (a) of Korean Patent Application No. 10-2020-0169232 filed on Dec. 7, 2020 in the Korean Intellectual Property Office, the entire disclosure of which is incorporated herein by reference for all purposes.

TECHNICAL FIELD

The present disclosure relates to a multilayer ceramic electronic component.

BACKGROUND

In general, electronic components using ceramic materials, such as capacitors, inductors, piezoelectric elements, varistors or thermistors, include a ceramic body formed of a ceramic material, internal electrodes formed inside of the body, and external electrodes installed on the surface of the ceramic body to be connected to the internal electrodes.

In recent years, as electronic products have been miniaturized and multifunctionalized, chip parts have also been miniaturized and have become highly functional. Therefore, multilayer ceramic electronic parts are also required for high-capacity products having a small size and high capacity.

In the related art, the area of the dielectric layer is formed to be larger than the area of the internal electrode, such that a margin portion is formed in the remaining circumferential portions of internal electrodes, excluding a portion thereof connected to the external electrode. However, in this case, when tens to hundreds of dielectric layers are stacked, the dielectric layers may be stretched to fill step portions, and the internal electrodes may also be bent. When the internal electrode is bent, a problem occurs in that the breakdown voltage (BDV) decreases in the corresponding part.

To prevent this problem, a method of separately preparing and attaching a sheet-shaped margin portion has recently been used. However, when a separately manufactured sheet is attached to form a margin portion, there is a problem in which delamination occurs between the margin portion and the ceramic body.

SUMMARY

Exemplary embodiments provide a multilayer ceramic electronic component having improved reliability in moisture resistance.

Exemplary embodiments provide a multilayer ceramic electronic component having improved mechanical strength.

According to an exemplary embodiment, a multilayer ceramic electronic component includes a ceramic body including a dielectric layer and a first internal electrode and a second internal electrode disposed to face each other with the dielectric layer interposed therebetween; a first external electrode connected to the first internal electrode; and a second external electrode connected to the second internal electrode. The ceramic body includes a capacitance formation portion having a first surface and a second surface opposing each other in a first direction, a third surface and a fourth surface opposing each other in a second direction, and a fifth surface and a sixth surface opposing each other in a third direction, the capacitance formation portion including the first internal electrode and the second internal electrode stacked in the third direction to form capacitance, the ceramic body including a first margin portion disposed on the third and fifth surfaces of the capacitance formation portion, and a second margin portion disposed on the fourth and sixth surfaces of the capacitance formation portion and differentiated from the first margin portion.

According to an exemplary embodiment, a multilayer ceramic electronic component includes a ceramic body including a dielectric layer, and a first internal electrode and a second internal electrode disposed to face each other with the dielectric layer interposed therebetween; a first external electrode connected to the first internal electrode; and a second external electrode connected to the second internal electrode. The ceramic body includes a capacitance formation portion having first and second surfaces opposing each other in a first direction, third and fourth surfaces opposing each other in a second direction, and fifth and sixth surfaces opposing each other in a third direction, the capacitance formation portion including the first and second internal electrodes stacked in the third direction to form capacitance, the ceramic body including a first margin portion disposed on the third and fifth surfaces and a second margin portion disposed on the fourth and sixth surfaces.

According to an exemplary embodiment, a multilayer ceramic electronic component includes a ceramic body including a dielectric layer and a first internal electrode and a second internal electrode disposed to face each other with the dielectric layer interposed therebetween; a first external electrode connected to the first internal electrode; and a second external electrode connected to the second internal electrode. The ceramic body includes a capacitance formation portion having a first surface and a second surface opposing each other in a first direction, a third surface and a fourth surface opposing each other in a second direction, and a fifth surface and a sixth surface opposing each other in a third direction. The capacitance formation portion includes the first internal electrode and the second internal electrode stacked in the third direction to form capacitance. The ceramic body includes margin portions disposed on third to sixth surfaces. In a second direction-third direction cross section, interfaces between the margin portions are disposed only at two diagonal corners of the ceramic body.

According to an exemplary embodiment, a method for manufacturing a multilayer ceramic electronic component includes forming a capacitance formation portion having a first surface and a second surface opposing each other in a first direction, a third surface and a fourth surface opposing each other in a second direction, and a fifth surface and a sixth surface opposing each other in a third direction, the capacitance formation portion including the first internal electrode and the second internal electrode stacked in the third direction to form capacitance; simultaneously forming a first margin portion on the third surface and the fifth surface; simultaneously forming a second margin portion on the fourth surface and the sixth surface; forming a first external electrode to connect to the first internal electrode; and forming a second external electrode to connect to the second internal electrode.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
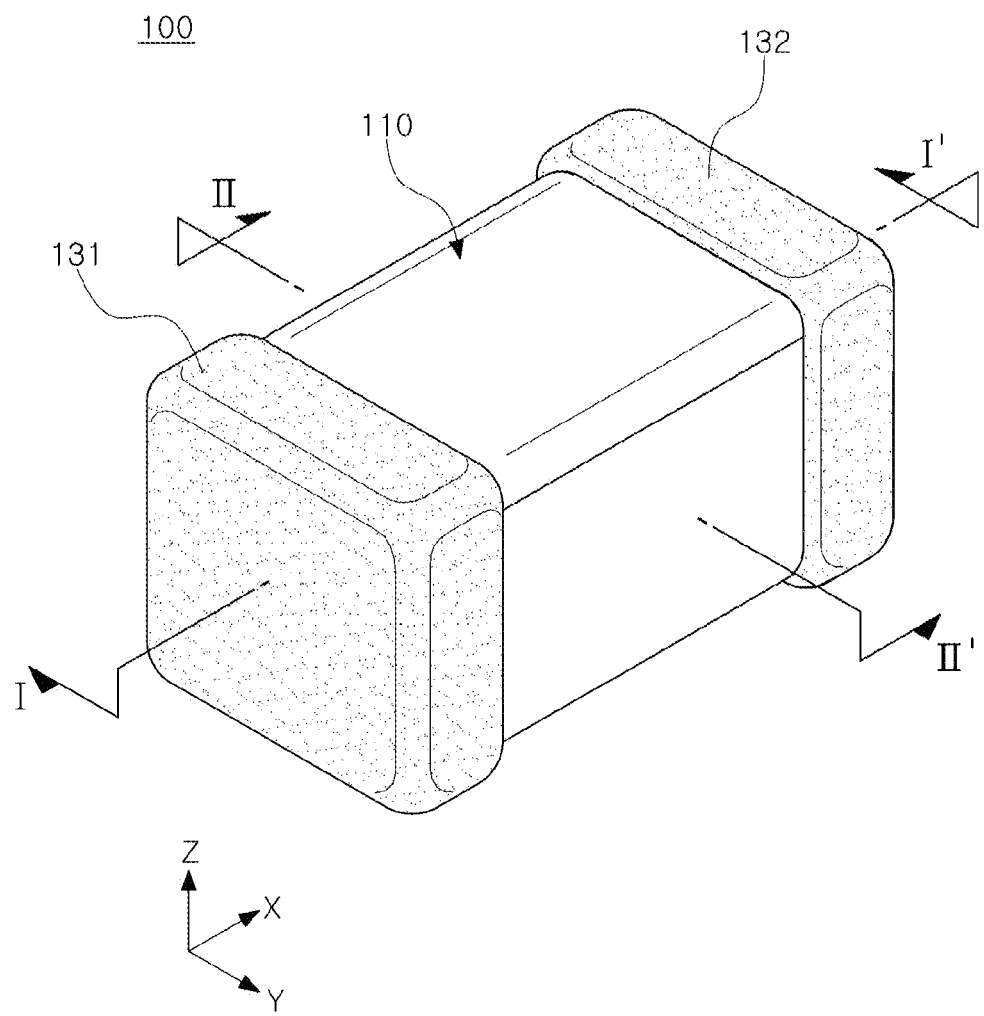
FIG. 1 is a perspective view schematically illustrating a multilayer ceramic electronic component according to an exemplary embodiment.
Figure 2:
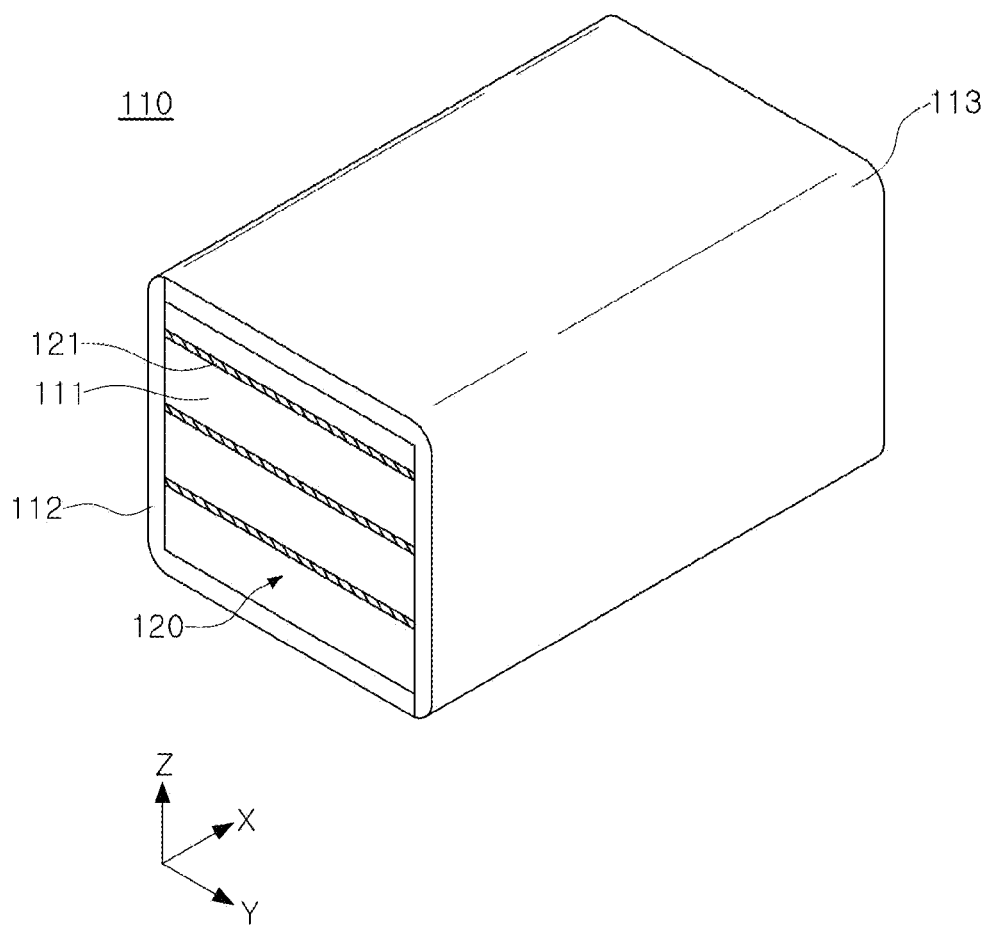
FIG. 2 is a perspective view schematically illustrating a ceramic body of FIG. 1.
Figure 3:
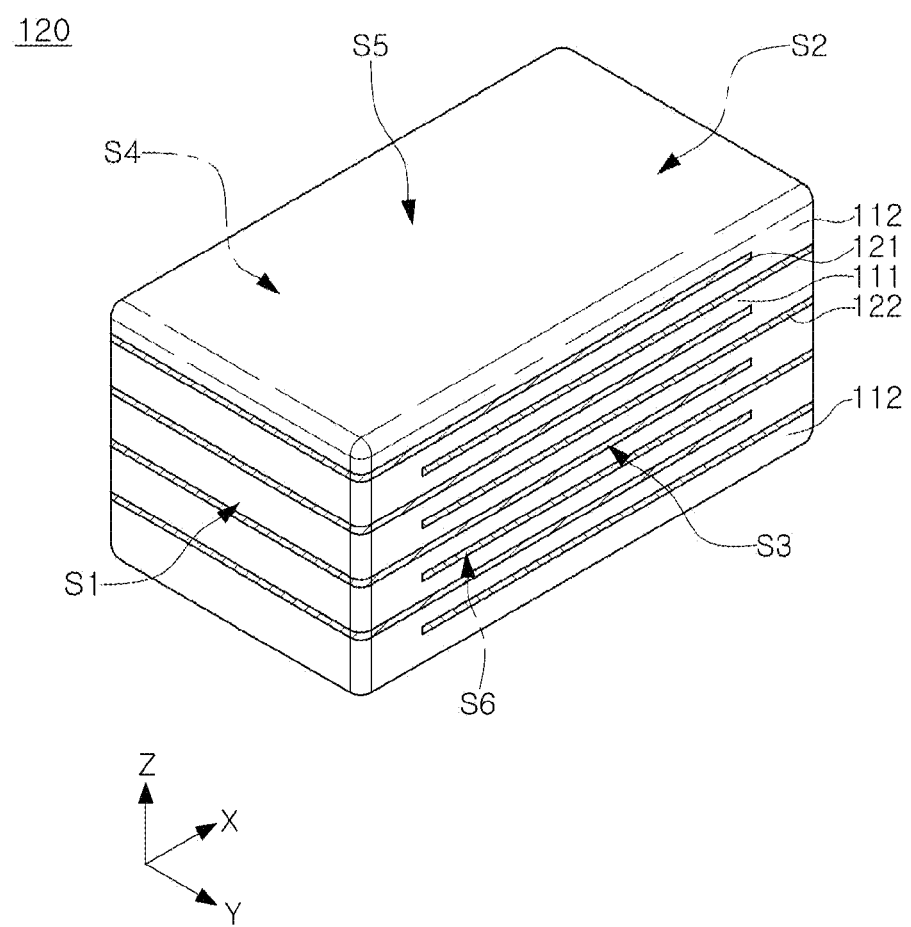
FIG. 3 is a perspective view schematically illustrating a capacitance formation portion of FIG. 1.
Figure 4:
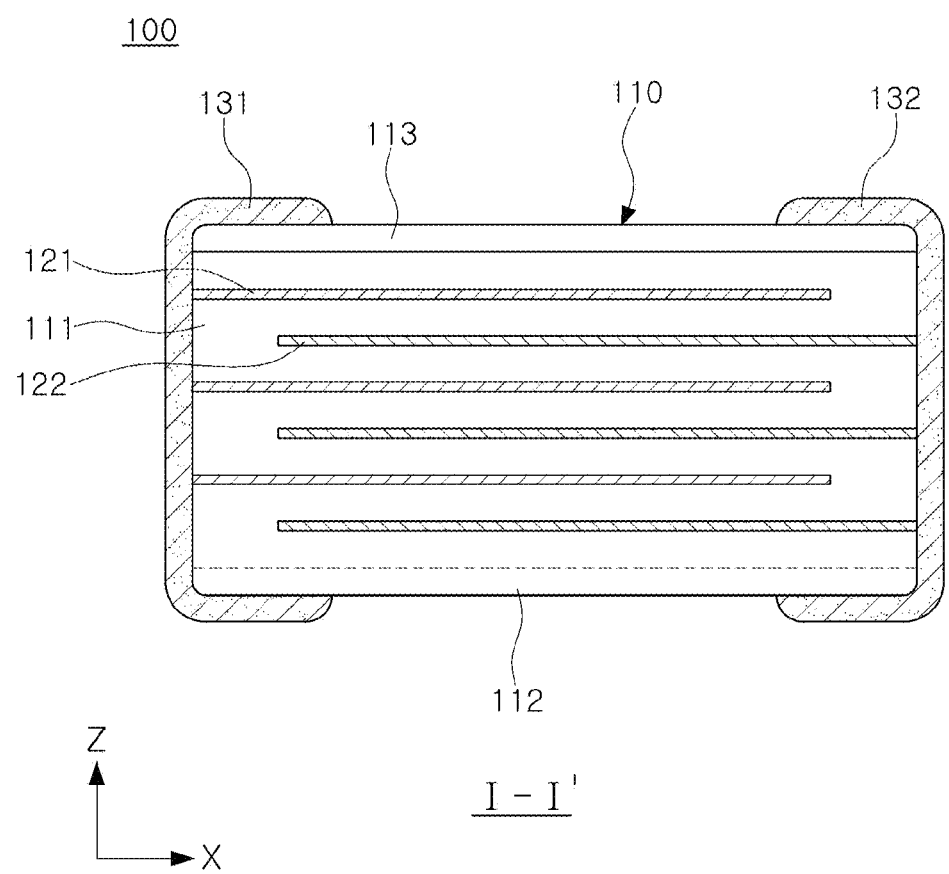
FIG. 4 is a cross-sectional view taken along line I-I' of FIG. 1.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least an example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

In this specification, expressions such as "A or B", "at least one of A or/and B", or "one or more of A or/and B" may include all possible combinations of items listed together. For example, "A or B", "at least one of A and B", or "at least one of A or B" may indicate all cases including (1) at least one A, (2) at least one B, or (3) both at least one A and at least one B.

In the drawings, the X direction may be defined as a first direction, an L direction or a length direction, a Y direction may be defined as a second direction, a W direction or a width direction, and a Z direction may be defined as a third direction, a T direction, or a thickness direction.

The present disclosure relates to a multilayer ceramic electronic component. FIGS. 1 to 6 are diagrams schematically illustrating a multilayer ceramic electronic component according to an exemplary embodiment. Referring to FIGS. 1 to 6, a multilayer ceramic electronic component 100 according to an embodiment includes a ceramic body 110 that includes a dielectric layer 111, and a first internal electrode 121 and a second internal electrode 122 disposed to face each other with the dielectric layer 111 interposed therebetween; a first external electrode 131 connected to the first internal electrode 121; and a second external electrode 132 connected to the second internal electrode 122. The ceramic body 110 includes a capacitance formation portion 120 which has a first surface S1 and a second surface S2 opposing each other in a first direction (X direction), a third surface S3 and a fourth surface S4 opposing each other in a second direction (Y direction), and a fifth surface S5 and a sixth surface S6 opposing each other in a third direction (Z direction). The ceramic body 110 includes the first internal electrode 121 and the second internal electrode 122 stacked in the third direction (Z direction) to form capacitance; a first margin portion 113 disposed on the third and fifth surfaces S3 and S5 of the capacitance formation portion 120; and a second margin portion 112 disposed on the fourth and sixth surfaces S4 and S6 of the capacitance formation portion 120.

In the ceramic body 110 of this embodiment, disposing the first margin portion 113 on the third and fifth surfaces S5 of the capacitance formation portion 120 may indicate that the first margin portion is disposed on two surfaces among both surfaces of the capacitance formation portion 120 in the second direction (Y direction) and both surfaces thereof in the third direction (Z direction). In addition, disposing the second margin portion 112 on the fourth and sixth surfaces of the capacitance formation portion 120 in the ceramic body 110 may indicate that the second margin portion 112 is disposed on two surfaces among both surfaces of the capacitance formation portion 120 in the second direction (Y direction) and both surfaces thereof in the third direction (Z direction). For example, the multilayer ceramic electronic component of this embodiment may have a structure in which two margin portions, for example, a first margin portion 113 and a second margin portion 112 each are disposed on one of both surfaces of the capacitance formation portion in the second direction (Y direction) and on one of both surfaces thereof in the third direction (Z direction).

Figure 14:
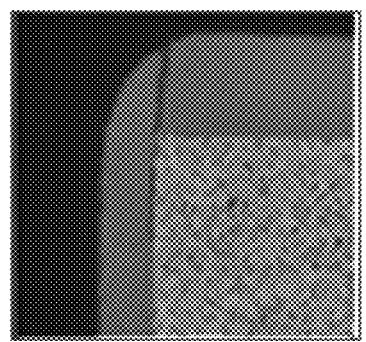
FIG. 14 is an image of a cover portion in which delamination occurs in a related art structure.

FIG. 14 is an image of a Y-Z cross section of a related art multilayer ceramic electronic component. A related art multilayer ceramic electronic component has a structure, in which a cover portion is attached to the top and bottom of the capacitance formation portion, and then a margin portion is attached to cover both sides of the capacitance formation portion and the cover portion. In this case, there may be a problem in that the margin portion is opened in the manufacturing process. FIG. 14 illustrates a case of a multilayer ceramic electronic component with an open margin portion as described above. Referring to FIG. 14, in the case in which delamination occurs at the margin portion, the internal electrodes are immediately exposed to external moisture.

Meanwhile, an embodiment of the present disclosure has a structure in which the cover portion and the margin portion are not separately formed. The above-described delamination of the cover portion and the margin portion may occur due to different degrees of polishing of the cover portion and the margin portion during the process of polishing the ceramic body, due to the difference in density between the cover portion and the margin portion, and may also occur due to a difference in shrinkage behavior in the sintering process of the cover portion and the margin portion. In the multilayer ceramic electronic component 100 according to an embodiment, the first margin portion 113 is disposed on the third surface S3 and the fifth surface S5 of the capacitance formation portion 120, and the second margin portion 112 is disposed on the fourth surface S4 and the sixth surface S6 of the capacitance formation portion 120 to reduce the number of bonding points of the cover portion/margin, thereby reducing the possibility of delamination.

In an embodiment, the ceramic body 110 may include the capacitance formation portion 120, the first margin portion 113, and the second margin portion 112.

There is no particular limitation on the specific shape of the ceramic body 110, but as illustrated, the ceramic body 110 may have a hexahedral or similar shape. Due to the shrinkage of the ceramic powder contained in the ceramic body 110 during the sintering process, the ceramic body 110 may have a substantially hexahedral shape, although it is not a hexahedral shape having a complete straight line. If necessary, the ceramic body 110 may be rounded so that the edges are not angled. The round treatment may be performed using, for example, barrel polishing or the like, but the method thereof is not limited thereto.

In the capacitance formation portion 120 of the multilayer ceramic electronic component 100 according to an embodiment, the dielectric layer 111, the first internal electrode 121, and the second internal electrode 122 may be alternately stacked. The dielectric layer 111, the first internal electrode 121, and the second internal electrode 122 may be stacked in the third direction (Z direction). The plurality of dielectric layers 111 forming the capacitance formation portion 120 are in a sintered state, and the boundary between the adjacent dielectric layers 111 may be integrated so that it is difficult to determine without using a scanning electron microscope (SEM).

According to an embodiment, a raw material for forming the dielectric layer 111 is not particularly limited as long as sufficient capacitance may be obtained. For example, a barium titanate-based material, a lead composite perovskite-based material, a strontium titanate-based material or the like is used, or a component represented by $(Ba_{1-x}Ca_x)(Ti_{1-y}(Zr, Sn, Hf)_y)O_3$ (in this case, $0 \leq x \leq 1$ and $0 \leq y \leq 0.5$), or the like, may be used. In addition, as a material for forming the dielectric layer 111, various ceramic additives, organic solvents, plasticizers, binders, dispersants, or the like may be added to powder such as barium titanate ($BaTiO_3$) according to the object of the present disclosure.

The dielectric layer 111 may be formed by adding an additive to a slurry containing the above-described material as necessary, and applying and drying the same on a carrier film to prepare a plurality of ceramic sheets. The ceramic sheet may be formed by fabricating the slurry in a sheet shape having a thickness of several μm by a doctor blade method, but the formation method is not limited thereto.

The first and second internal electrodes 121 and 122 may be stacked in such a manner that end surfaces thereof are exposed to opposite ends of the ceramic body 110, respectively. In detail, the first and second internal electrodes 121 and 122 may be exposed to both surfaces of the ceramic body 110 in the first direction (X direction), respectively, and the first internal electrode 121 may be exposed to the first surface of the ceramic body 110, and the second internal electrode 122 may be exposed to the second surface S2.

The material forming the first and second internal electrodes 121 and 122 is not particularly limited, and for example, a conductive paste including at least one of silver (Ag), palladium (Pd), gold (Au), platinum (Pt), nickel (Ni), Copper (Cu), tin (Sn), tungsten (W), titanium (Ti), and alloys thereof may be used.

The ceramic body 110 may be formed by alternately stacking, a ceramic green sheet on which the first internal electrode 121 is printed on the dielectric layer, and a ceramic green sheet on which the second internal electrode 122 is printed on the dielectric layer, in the third direction (Z direction). The printing method of the first and second internal electrodes 121 and 122 may be a screen-printing method or a gravure printing method, but is not limited thereto.

The ceramic body 110 according to an embodiment may include the capacitance formation portion 120, the first margin portion 113 disposed on the third and fifth surfaces S3 and S5 of the capacitance formation portion 120, and the second margin portion 112 disposed on the fourth surface S4 and the sixth surface S6 of the capacitance formation portion 120.

In an embodiment, the first margin portion 113 of the multilayer ceramic electronic component 100 is disposed in contact with the third surface S3 and the fifth surface S5 of the capacitance formation portion 120 simultaneously, and the second margin portion 112 may be disposed in contact with the fourth surface S4 and the sixth surface S6 of the capacitance formation portion 120 simultaneously. Referring to FIGS. 1 to 6, the first margin portion 113 is attached to the third surface S3 of the capacitance formation portion 120, and simultaneously therewith, may be disposed extending to the fifth surface S5 of the capacitance formation portion 120 and be attached while in contact with the fifth surface S5 of the capacitance formation portion 120. In addition, the second margin portion 112 is attached while in contact with the fourth surface S4 of the capacitance formation portion 120, and simultaneously therewith, may be disposed extending to the sixth surface S6 of the capacitance formation portion 120 and be attached while in contact with the sixth surface S6 of the capacitance formation portion 120.

As in this embodiment, the first margin portion 113 is disposed in contact with two surfaces of the capacitance formation portion 120 simultaneously, and the second margin portion 112 is disposed in contact with the other two surfaces of the capacitance formation portion 120 simultaneously. As a result, all the exterior of the capacitance formation portion 120 may be covered with only two margin portions. Thus, compared to the use of four components, for example, two cover portions and two margin portions in the related art, as in the above embodiment of the present disclosure, by covering the exterior of the capacitance formation portion 120 with only two margin portions, the number of cases in which delamination occurs may be reduced, thereby increasing the mechanical strength of electronic components.

Each of the first margin portion 113 and the second margin portion 112 may have a single structure. That the first margin portion 113 and the second margin portion 112 respectively have a single structure may indicate that the first margin portion 113 is formed of one component rather than a combination of a plurality of components, and may indicate that the second margin portion 112 is formed of one component rather than a combination of a plurality of components. For example, in the multilayer ceramic electronic component 100 according to this embodiment, there may be two components surrounding the exterior of the capacitance formation portion 120. By reducing the number of components attached to the exterior of the capacitance formation portion 120 as in this embodiment, a path through which external moisture or the like penetrates may be significantly reduced.

In an example, the ceramic body 110 may include a first interface 113a and a second interface 112a at which the first margin portion 113 and the second margin portion 112 contact each other. In the present specification, the "interface" may mean a surface on which two layers in contact with each other are distinguishable from each other. Accordingly, the second margin portion 112 of the multilayer ceramic electronic component 100 according to this example may be distinguished from the first margin portion 113. The distinguishable state may mean that the two layers are distinguished due to a physical difference, a chemical difference, and/or a simple optical difference. The interface may be visually confirmed through a scanning electron microscope (SEM), but is not limited thereto. When it is difficult to visually confirm, it may be confirmed by analyzing physical properties of the first margin portion 113 and the second margin portion 112. In one example, the first interface 113a and the second interface 112a may be respectively disposed at two opposing diagonal corners of the cross-sectional cut where the first margin portion 113 and the second margin portion 112 meet each other. On the other hand, because the first margin portion 113 and the second margin portion 112 each are a continuous margin portion (or a single margin portion as described below), the other two opposing diagonal corners in the cross-sectional cut may not have an interface in a material forming the first margin portion 113 and the second margin portion 112.

Figure 5:
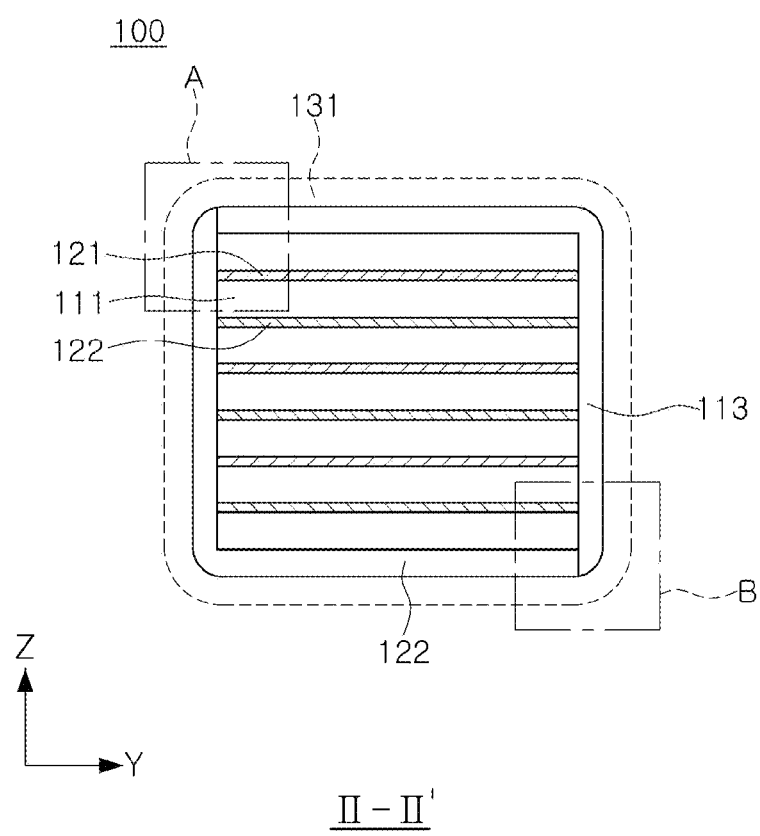
FIG. 5 is a cross-sectional view taken along line II-II' of FIG. 1.
Figure 6:
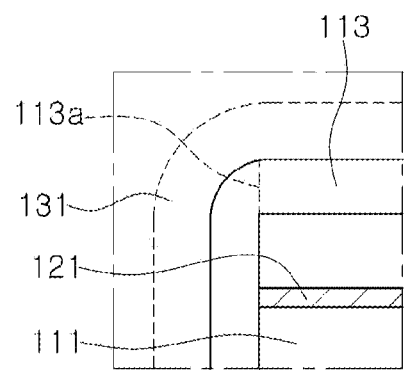
FIG. 6 is an enlarged view of areas A and B of FIG. 5.
Figure 6:
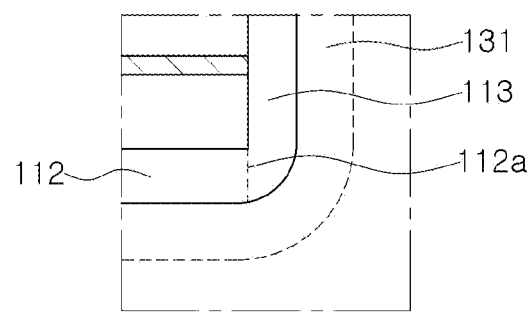

FIG. 5 is a cross-sectional view taken along line II-II' of FIG. 1, and FIG. 6 is an enlarged view of regions A and B of FIG. 5. Referring to FIGS. 5 and 6, the ceramic body 110 of the multilayer ceramic electronic component 100 according to an embodiment may include two interfaces where the first margin portion 113 and the second margin portion 112 contact each other. The interface may be divided into, for example, a first interface 113a and a second interface 112a.

In the above example, the first interface 113a at which the first margin portion 113 and the second margin portion 112 of the multilayer ceramic electronic component 100 according to an embodiment contact each other is disposed on the same plane as the third surface S3 of the capacitance formation portion 120, and the second interface 112a may be disposed on the same plane as the fourth surface S4 of the capacitance formation portion 120. Referring to FIGS. 5 and 6, the first interface 113a of the multilayer ceramic electronic component 100 according to this example may be disposed on the same plane as the third surface S3 of the capacitance formation portion 120. The second interface 112a may be disposed on the same plane as the fourth surface S4 of the capacitance formation portion 120. The fact that the interface is disposed on the same plane as any one surface of the capacitance formation portion 120 does not mean only the same plane in a strict sense, but may include a case in which an angle between the interface and any one surface of the capacitance formation portion is within a certain range. The range of the angle may indicate an angle of 10° or less, for example, and the lower limit thereof is not particularly limited, but may be, for example, 0° or more. The angle between the interface and any one surface of the capacitance formation portion may indicate an average of angles of contacting surfaces at any five points on which the interface and the one surface of the capacitance formation portion contact each other.

In an embodiment of the present disclosure, only the first margin portion 113 is formed at an edge at which the third and fifth surfaces S3 and S5 of the capacitance formation portion 120 of the multilayer ceramic electronic component 100 according to an embodiment contact each other. That is, the first margin portion 113 extends continuously from the third surface S3 to the fifth surface S5 to cover an edge therebetween. Only the second margin portion 112 may be disposed at an edge at which the fourth and sixth surfaces of the capacitance formation portion 120 contact each other. That is, the second margin portion 112 extends continuously from the fourth surface S4 to the sixth surface S6 to cover an edge therebetween. In the multilayer ceramic electronic component 100 according to an embodiment, two margin portions, for example, the first margin portion 113 and the second margin portion 112 may be disposed surrounding the four surfaces of the capacitance formation portion 120. Accordingly, the first margin portion 113 and the second margin portion 112 may be disposed to cover two surfaces of the capacitance formation portion 120, respectively. Therefore, only the first margin portion 113 is disposed at the edge at which the third and fifth surfaces S3 and S5 of the capacitance formation portion 120 of the multilayer ceramic electronic component 100 in this embodiment contact each other, and only the second margin portion 112 may be disposed at an edge at which the fourth surface S4 and the sixth surface S6 of the capacitance formation portion 120 contact each other. For example, a single margin portion may be disposed on the third surface S3 and the fifth surface S5 of the capacitance formation portion 120, and a single margin portion may be disposed on the fourth surface S4 and the sixth surface S6 of the capacitance formation portion 120, which may mean that one margin portion covers both surfaces of the capacitance formation portion 120 simultaneously. In one example, a single margin portion may refer to a margin portion continuously extending. In another example, a single margin portion may refer to a margin portion without an internal interface.

In an embodiment, a maximum value of widths of the first margin portion 113 and the second margin portion 112 of the multilayer ceramic electronic component 100 in the second direction (Y direction) may be greater than a maximum value of a vertical distance between the third and fourth surfaces S3 and S4 of the capacitance formation portion 120. The maximum value of the widths of the first and second margin portions 113 and 112 in the second direction (Y direction) may indicate a maximum value from the interface between the first and second margin portions 113 and 112, up to any one surface of the first margin portion 113 or the second margin portion 112 in the second direction. In addition, the vertical distance between the third surface S3 and the fourth surface S4 of the capacitance formation portion 120 may be a value measured based on a line perpendicular to the third surface S3 of the capacitance formation portion 120 and a line perpendicular to the fourth surface S4 of the capacitance formation portion 120. A maximum value of the vertical distance between the third surface S3 and the fourth surface S4 of the capacitance formation portion 120 may indicate a maximum value among the values measured based on the vertical line.

In the above embodiment, a sum of a width of the fifth surface S5 of the capacitance formation portion 120 in the second direction (Y direction) and a height of the third surface S3 thereof in the third direction (Z direction) may be less than a sum of the width of the first margin portion 113 in the second direction (Y direction) and the height thereof in the third direction (Z direction). In addition, a sum of a width of the sixth surface S6 of the capacitance formation portion 120 in the second direction (Y direction) and a height of the fourth surface S4 in the third direction (Z direction) may be less than a sum of a width of the second margin portion 112 in the second direction (Y direction) and a height thereof in the third direction (Z direction). In this embodiment, in detail, all of both surfaces of the capacitance formation portion 120 in the second direction (Y direction) and both surfaces thereof in the third directions (Z direction), in the multilayer ceramic electronic component 100 according to an embodiment, may be covered with only the first margin portion 113 and the second margin portion 112.

In an example, the X-Z cross section of the first margin portion 113 and/or the second margin portion 112 of the multilayer ceramic electronic component 100 according to an embodiment may have an L shape. The X-Z cross section of the first margin portion 113 and/or the second margin portion 112 may indicate a cross section cut as a plane perpendicular to the first direction (X direction) of the ceramic body 110 of the multilayer ceramic electronic component 100. The L-shape of the first margin portion 113 and/or the second margin portion 112 may be a shape formed by a cutting surface in the second direction (Y direction) and a cutting surface in the third direction (Z direction), in the cutting surfaces of the first margin portion 113 and the second margin portion 112.

The first margin portion 113 and the second margin portion 112 may include a ceramic material, for example, a barium titanate ($BaTiO_3$)-based ceramic material.

The first margin portion 113 and the second margin portion 112 may be formed by stacking a single dielectric layer or two or more dielectric layers, respectively, and may basically serve to prevent damage to the internal electrodes due to physical or chemical stress.

In an embodiment, the first margin portion 113 and the second margin portion 112 of the multilayer ceramic electronic component 100 according to an embodiment may include a ceramic component having a composition similar to that of the dielectric layer 111 of the capacitance formation portion 120, as a main component. In the present specification, the term "main component" may mean a component that occupies a relatively large weight ratio compared to other components, and may mean a component that is 50% by weight or more based on the weight of the entire composition or the entire dielectric layer. In addition, "subcomponent" may mean a component that occupies a relatively small weight ratio compared to other components, and may mean a component that is less than 50% by weight based on the weight of the entire composition or the entire dielectric layer.

The main component may be a component represented by $(Ba_{1-x}Ca_x)(Ti_{1-y}(Zr, Sn, Hf)_y)O_3$ ($0 \leq x \leq 1$, $0 \leq y \leq 0.5$). The main component may be, for example, a chemical in which Ca, Zr, Sn and/or Hf are partially dissolved in $BaTiO_3$. In the above compositional formula, x may be in the range of 0 or more and 1 or less, and y may be in the range of 0 or more and 0.5 or less, but is not limited thereto. For example, when x is 0, y is 0, and z is 0 in the above composition formula, the main component may be $BaTiO_3$.

In an example, the first and second margin portions 113 and 112 of the multilayer ceramic electronic component 100 according to an embodiment may include at least one selected from the group consisting of sodium (Na), lithium (Li), and boron (B), as a subcomponent. In another example of the present disclosure, the first and second margin portions 113 and 112 of the multilayer ceramic electronic component 100 according to an embodiment may include magnesium (Mg) as the subcomponent. As described above, the density of the first and second margin portions 113 and 112 may be adjusted by adjusting the content of the sub-component in the first and second margin portions 113 and 112, thereby improving moisture resistance.

According to an example of the present disclosure, the average thickness of the first margin portion 113 and/or the second margin portion 112 of the multilayer ceramic electronic component 100 may be in a range of 10 μm or more and 25 μm or less. In this specification, "thickness" may indicate the thickness of a member measured in a direction perpendicular to the surface of the member, and "average thickness" may indicate an arithmetic average of the thickness measured at the point at which the area in which the first margin portion 113 and/or the second margin portion 112 is disposed is divided into 10 equal parts at equal intervals in the second direction (Y direction), with respect to the cut surface (Y-Z plane) cut in a direction perpendicular to the X axis (or alternatively, the cut surface (X-Y plane) cut in a direction perpendicular to the Z axis) while passing through the center of the multilayer ceramic electronic component 100. For example, a scanning electron microscope (SEM) may be used to measure a thickness or the like. Other methods and/or tool appreciated by one of ordinary skill in the art, even if not described in the present disclosure, may also be used.

In an embodiment, a thickness deviation (|a–b|/a) of an average thickness (b) of the first margin portion 113 disposed on the fifth surface S5 of the capacitance formation portion 120, to an average thickness (a) of the first margin portion 113 disposed on the third surface S3 of the capacitance formation portion 120 of the multilayer ceramic electronic component 100, may be 5% or less. The average thickness (b) of the first margin portion 113 disposed on the fifth surface S5 of the capacitance formation portion 120 may indicate the average thickness of the first margin portion 113 in the third direction (Z direction), in contact with the fifth surface S5 of the capacitance formation portion 120, and may indicate an arithmetic average of distances in the third direction (Z direction), measured at 10 points at equal intervals on the X-Z cross section passing through the center of the multilayer ceramic electronic component 100, with respect to the first margin portion 113 in contact with the fifth surface S5 of the capacitance formation portion 120. The average thickness (a) of the first margin portion 113 disposed on the third surface S3 of the capacitance formation portion 120 may be a value measured on the first margin portion 113 in contact with the third surface S3 of the capacitance formation portion 120 by the method described above. The thickness deviation (|a–b|/a) of the average thickness (b) of the first margin portion 113 disposed on the fifth surface S5 of the capacitance formation portion 120, to the average thickness (a) of the first margin portion 113 disposed on the third surface S3 of the capacitance formation portion 120, may be 5% or less, 4% or less, or 3% or less, and the lower limit thereof is not particularly limited, but may be, for example, 0% or more.

In addition, a thickness deviation (|c–d|/c) of an average thickness d of the second margin portion 112 disposed on the sixth surface S6 of the capacitance formation portion 120 with respect to an average thickness (c) of the second margin portion 112 disposed on the fourth surface S4 of the capacitance formation portion 120 of the multilayer ceramic electronic component 100 according to an embodiment may be 5% or less. The average thickness (d) of the second margin portion 112 disposed on the sixth surface S6 of the capacitance formation portion 120 may indicate the average thickness of the second margin portion 112 in the third direction (Z direction) in contact with the sixth surface S6 of the capacitance formation portion 120, and may indicate an arithmetic average of distances in the third direction (Z direction) measured at 10 points at equal intervals on a line passing through the center of the multilayer ceramic electronic component 100 taken on an X-Z cross section, with respect to the second margin portion 112 in contact with the sixth surface S6 of the capacitance formation portion 120. The average thickness (c) of the second margin portion 112 disposed on the fourth surface S4 of the capacitance formation portion 120 may be a value measured on the second margin portion 112 in contact with the fourth surface S4 of the capacitance formation portion 120 by the method described above. The thickness deviation (|c–d|/c) of the average thickness (d) of the second margin portion 112 disposed on the sixth surface S6 of the capacitance formation portion 120, to the average thickness (c) of the second margin portion 112 disposed on the fourth surface S4 of the capacitance formation portion 120, may be 5% or less, 4% or less, or 3% or less, and the lower limit thereof is not particularly limited, but may be, for example, 0% or more.

In the related art structure, two cover portions are formed above and below the capacitance formation portion 120 and two margin portions are disposed left and right, so that there is a thickness variation between the cover portion/margin. However, in the case of the multilayer ceramic electronic component 100 according to an embodiment of the present disclosure, since the first margin portion 113 is disposed on the third and fifth surfaces S3 and S5 of the capacitance formation portion 120 simultaneously, a size variation after sintering may be reduced.

In an example, the thickness deviation (|a–d|/a) of the average thickness d of the second margin portion 112 disposed on the sixth surface S6 of the capacitance formation portion 120, relative to the average thickness (a) of the first margin portion 113 disposed on the third surface S3 of the capacitance formation portion 120 of the multilayer ceramic electronic component 100 according to an embodiment, may be 5% or less, 4% or less, or 3% or less, and may be 0% or more.

In addition, the thickness deviation (|c–b|/c) of the average thickness (b) of the first margin portion 113 disposed on the fifth surface S5 of the capacitance formation portion 120, with respect to the average thickness (c) of the second margin portion 112 disposed on the fourth surface S4 of the capacitance formation portion 120, may be 5% or less, 4% or less or 3% or less, and may be 0% or more.

In the multilayer ceramic electronic component 100 according to this example, the first margin portion 113 and the second margin portion 112 may be formed of the same ceramic sheet, to reduce the thickness deviation between the first margin portion 113 and the second margin portion 112.

In another embodiment of the present disclosure, in a multilayer ceramic electronic component 100 according to an embodiment, a first margin portion 113 and a second margin portion 112 may have different physical properties.

In an example, the first margin portion 113 and the second margin portion 112 of the multilayer ceramic electronic component 100 according to an embodiment may have different average densities. In the present specification, the "average density" may mean an average of the density of samples taken at equal intervals in the second direction (Y direction) with respect to the Y-Z cross section passing through the center of the multilayer ceramic electronic component 100, and for example, may be a value measured using a Density meter Excellence D6 manufactured by METTLER TOLEDO. The multilayer ceramic electronic component 100 of this embodiment includes the first margin portion 113 and a second margin portion 112 having different average densities to prevent cracks due to plastic mismatch that may occur during the sintering process, thereby further improving moisture resistance reliability. In the case of the average density of the margin portion, the average density of the first margin portion 113 may be greater than the average density of the second margin portion 112, but is not limited thereto.

According to an embodiment, each of the first margin portion 113 and the second margin portion 112 of the multilayer ceramic electronic component 100 includes a dielectric grain, and the average particle diameter of the dielectric grain of the first margin portion 113 and the average particle diameter of the dielectric grain of the second margin portion 112 may be different from each other. In the present specification, the "average particle diameter" of the grain may mean the average value of the length in the X-axis direction, calculated using an image analysis program (Image Pro Plus ver 4.5 by Mediacybernetics), after capturing images of 10 points at equal intervals in the second direction (Y direction) with a scanning electron microscope (SEM, JSM-7400F manufactured by Jeol), with respect to the Y-Z cross section passing through the center of the multilayer ceramic electronic component 100. The above-described average density and the like may be implemented by differently adjusting the average particle diameters of the dielectric grains of the first and second margin portions 113 and 112. In the case of the average particle diameter of the dielectric grains, the average particle diameter of the dielectric grains of the first margin portion 113 may be greater than the average particle diameter of the dielectric grains of the second margin portion 112, but is not limited thereto.

When the average density of the first and second margin portions 113 and 112 and/or the average particle diameter of the dielectric grains thereof are different as in this embodiment, the contents of subcomponents of the first and second margin portions 113 and 112 may be different. In detail, the first margin portion 113 and the second margin portion 112 may include one or more selected from the group consisting of sodium (Na), lithium (Li), and boron (B) as subcomponents, and the content of the sub-component in the first margin portion 113 may be higher than the content of the sub-component in the second margin portion 112.

In addition, the first margin portion 113 and the second margin portion 112 each contain magnesium (Mg), and the content of magnesium (Mg) in the first margin portion 113 and the content of magnesium (Mg) in the second margin portion 112 may be different. The density of the first and second margin portions 113 and 112 may be adjusted by adjusting the contents of the sub-component and magnesium (Mg). In the case of the content of magnesium (Mg), for example, the content of magnesium (Mg) in the second margin portion 112 may be higher than the content of magnesium (Mg) in the first margin portion 113, but is not limited thereto.

In another embodiment, in the multilayer ceramic electronic component 100 according to an embodiment, the dielectric layer 111 of the capacitance formation portion 120, and the first margin portion 113, may have different physical properties.

In the above embodiment, the average density of an outermost dielectric layer 111 of the capacitance formation portion 120 of the multilayer ceramic electronic component 100 according to an embodiment, in the third direction (Z direction), may be different from the average density of the first margin portion 113 disposed on the third surface S3 of the capacitance formation portion 120. In detail, the average density of the outermost dielectric layer 111 of the capacitance formation portion 120 in the third direction (Z direction) may be lower than the average density of the first margin portion 113 disposed on the third surface S3 of the capacitance formation portion 120.

In another embodiment, the dielectric layer 111 of the capacitance formation portion 120 and the first margin portion 113 of the multilayer ceramic electronic component 100 according to an embodiment each include a dielectric grain, and the average particle diameter of the dielectric grains of the outermost dielectric layer 111 of the capacitance formation portion 120 in the third direction (Z direction) may be different from the average particle diameter of the dielectric grains of the first margin portion 113 disposed on the third surface S3 of the capacitive portion 120. In detail, the average particle diameter of the dielectric grains of the outermost dielectric layer 111 of the capacitance formation portion 120 in the third direction (Z-direction) may be greater than the average particle diameter of the dielectric grain of the margin portion 113 disposed on the third surface S3 of the capacitance formation portion 120.

The description of the average density and the average particle diameter of the dielectric grain is the same as described above, and thus will be omitted.

Figure 7:
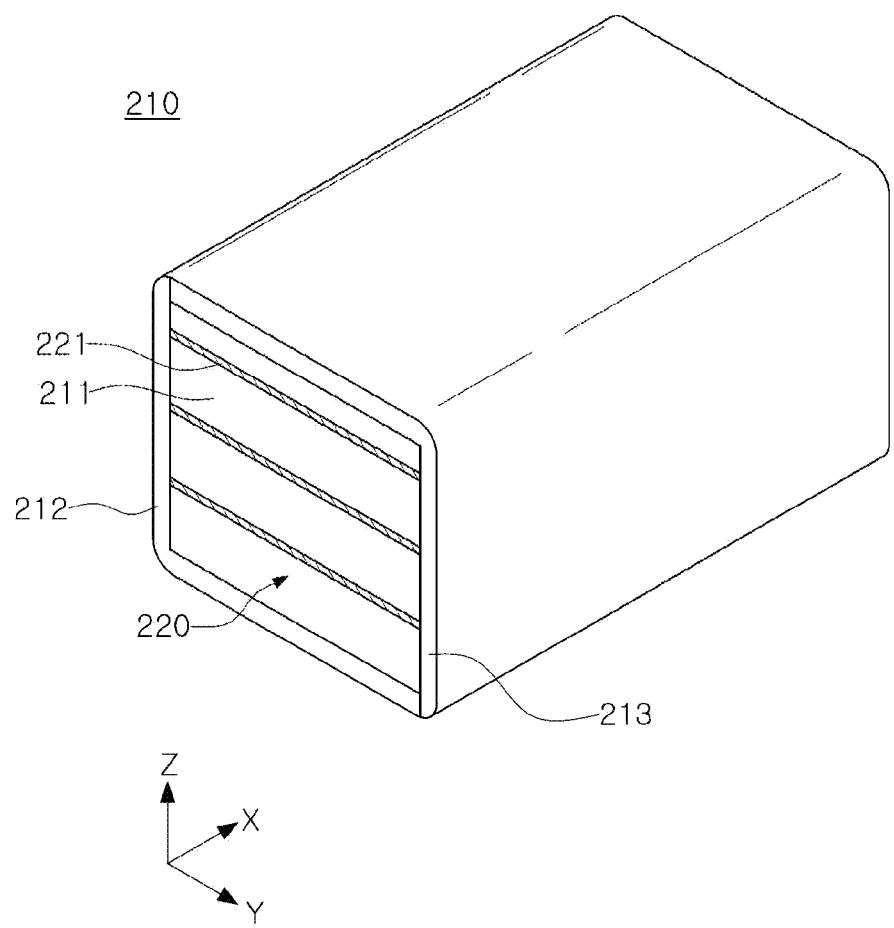
FIG. 7 is a perspective view schematically illustrating a ceramic body of a multilayer ceramic electronic component according to another exemplary embodiment.
Figure 8:
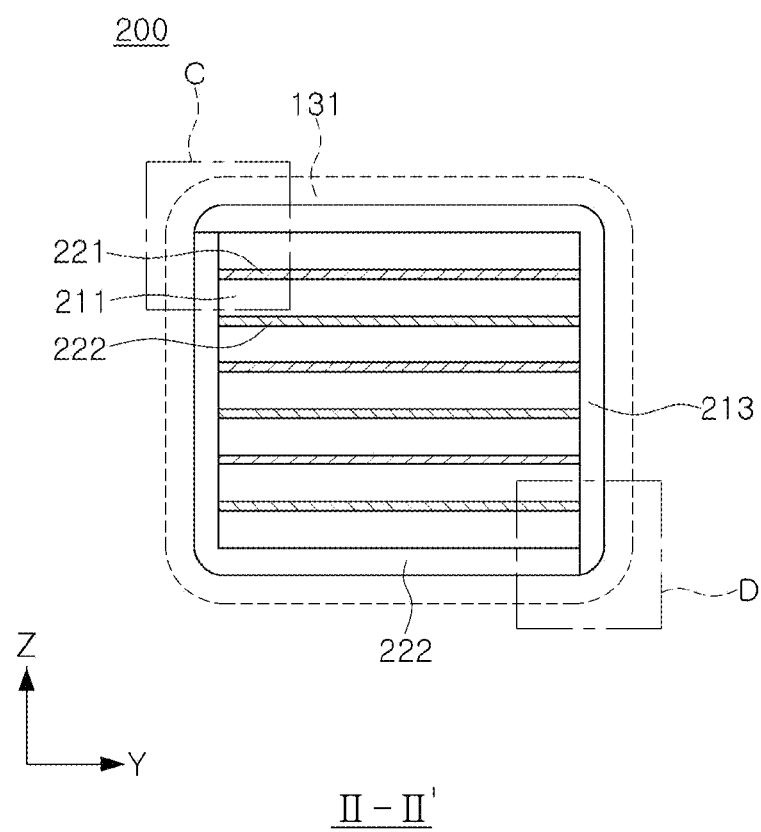
FIG. 8 is a cross-sectional view of FIG. 7.
Figure 9:
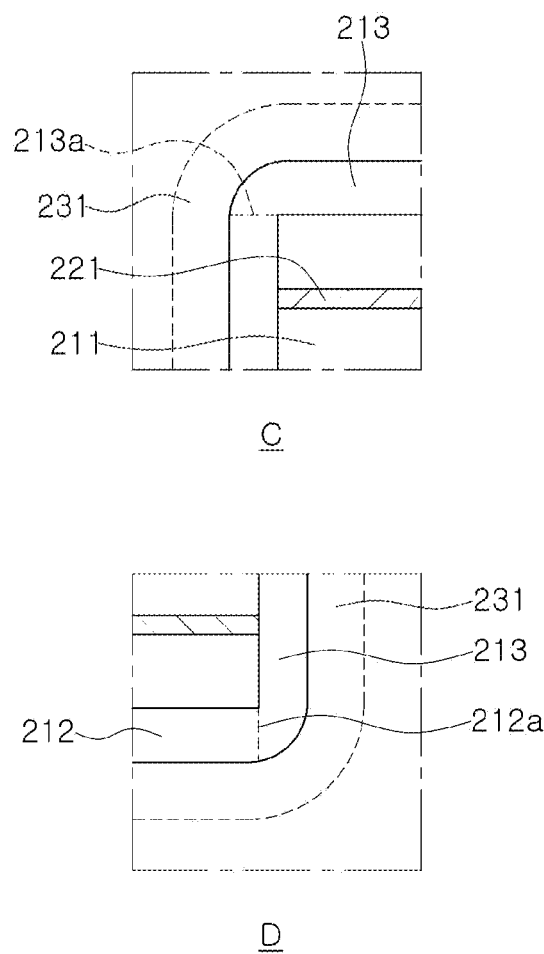
FIG. 9 is an enlarged view of areas C and D of FIG. 8.

In another embodiment of the present disclosure, a first margin portion 213 of a multilayer ceramic electronic component 200 may be disposed in contact with one surfaces of a capacitance formation portion 220 and a second margin portion 212 in the second direction (Y direction) and one surfaces thereof in the third direction (Z direction). FIGS. 7 to 9 are diagrams illustrating the multilayer ceramic electronic component 200 according to this embodiment. Referring to FIGS. 7 to 9, the first margin portion 213 of the multilayer ceramic electronic component 200 in this embodiment is disposed on the third surface S3 of the capacitance formation portion 220, and simultaneously, may be disposed on one surface of the second margin portion 212 in the second direction (Y direction). In addition, the first margin portion 213 may be simultaneously disposed on the fifth surface S5 of the capacitance formation portion 220 and one surface of the second margin portion 212 in the third direction (Z direction). For example, the first margin portion 213 may have a larger size than the second margin portion 212.

In the above embodiment, a first interface 213a and a second interface 212a at which the first margin portion 213 and the second margin portion 212 contact each other may be formed on one surface of the first margin portion 213 in the second direction (Y direction) and one surface of the second margin portion 212 in the third direction (Z direction), respectively. In this case, the first margin portion 213 and the second margin portion 212 have an asymmetric shape, and as described above, an electronic component having a required physical property may be provided by adjusting the average density and the average particle diameter of dielectric grains.

Figure 10:
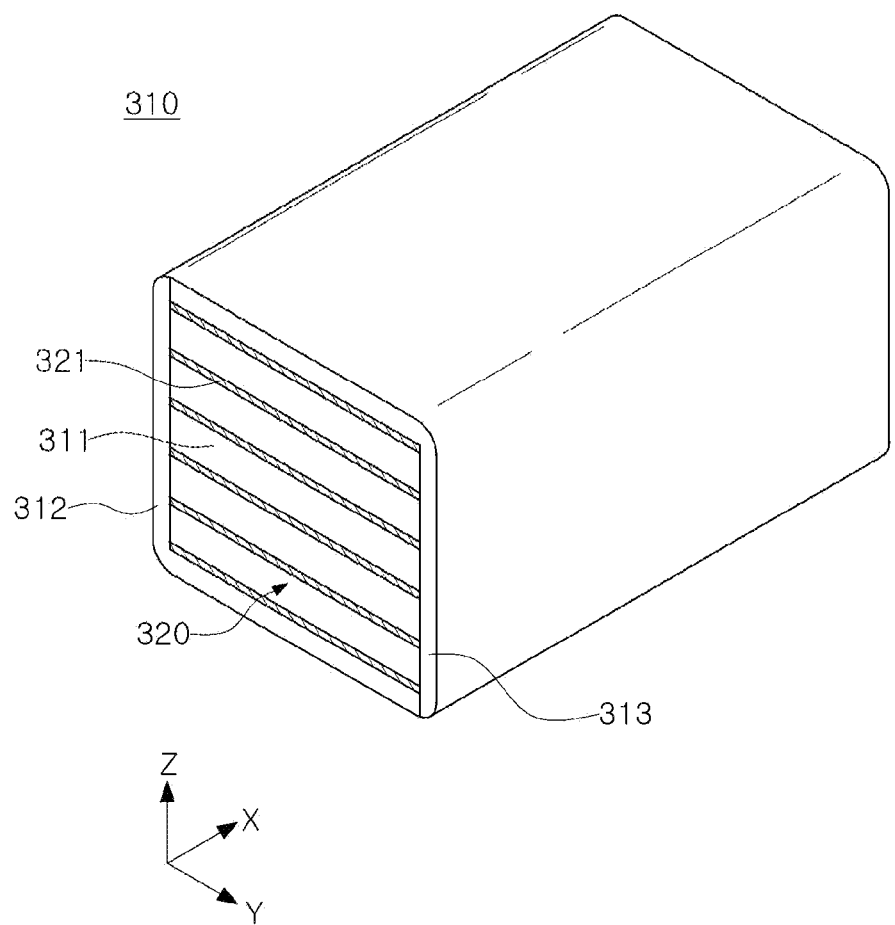
FIG. 10 is a perspective view schematically illustrating a ceramic body of a multilayer ceramic electronic component according to another exemplary embodiment.
Figure 11:
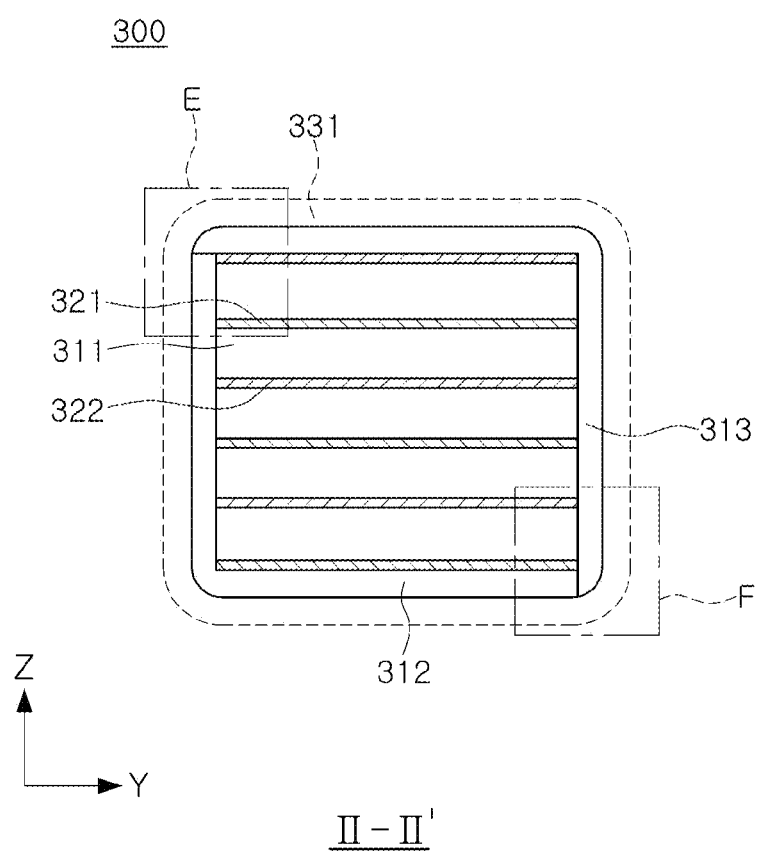
FIG. 11 is a cross-sectional view of FIG. 10.
Figure 12:
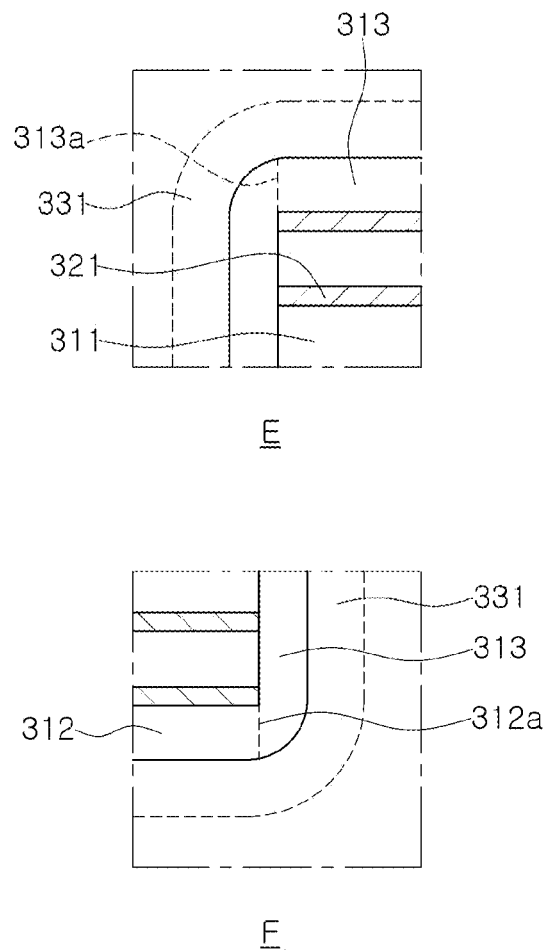
FIG. 12 is an enlarged view of areas E and F of FIG. 11.

In the case of a multilayer ceramic electronic component 300 according to an embodiment of the present disclosure, a first internal electrode 321 and/or a second internal electrode 322 may be exposed in the third direction (Z direction) of a capacitance formation portion 320. FIGS. 10 to 12 are diagrams schematically illustrating the multilayer ceramic electronic component 300 according to the embodiment. Referring to FIGS. 10 to 12, that the first internal electrode 321 and/or the second internal electrode 322 is exposed in the third direction (Z direction) of the capacitance formation portion 320 may mean that the first internal electrode 321 and/or the second internal electrode 322 is disposed on the outermost portion of the capacitance formation portion 320, in which a dielectric layer 311 and the first and second internal electrodes 321 and 322 are stacked in the third direction (Z direction). In this case, the first margin portion 313 and/or the second margin portion 312 described above may be disposed in direct contact with the first internal electrode 321 and/or the second internal electrode 322.

Even when the first internal electrode 321 and/or the second internal electrode 322 are disposed to be exposed in the third direction (Z direction) of the capacitance formation portion 320 as in this embodiment, the first and second internal electrodes 321 and 322 may not be exposed to the outside of a ceramic body 310 by the first margin portion 313 and the second margin portion 312. Therefore, the dielectric layer 311 may not be disposed on the outermost first internal electrode 321 and/or second internal electrode 322 in the third direction (Z direction), and the internal electrode may be disposed up to the outermost portion of the capacitance formation portion 320, thereby significantly increasing the effective capacitance.

In the above embodiment, the ceramic body 310 of the multilayer ceramic electronic component 300 may include a first interface 313a and a second interface 312a at which the first margin portion 313 and the second margin portion 312 Contact each other.

Descriptions of the capacitance formation portion, the internal electrode, the margin portion, and the interface are the same as described above, and thus will be omitted.

Figure 13:
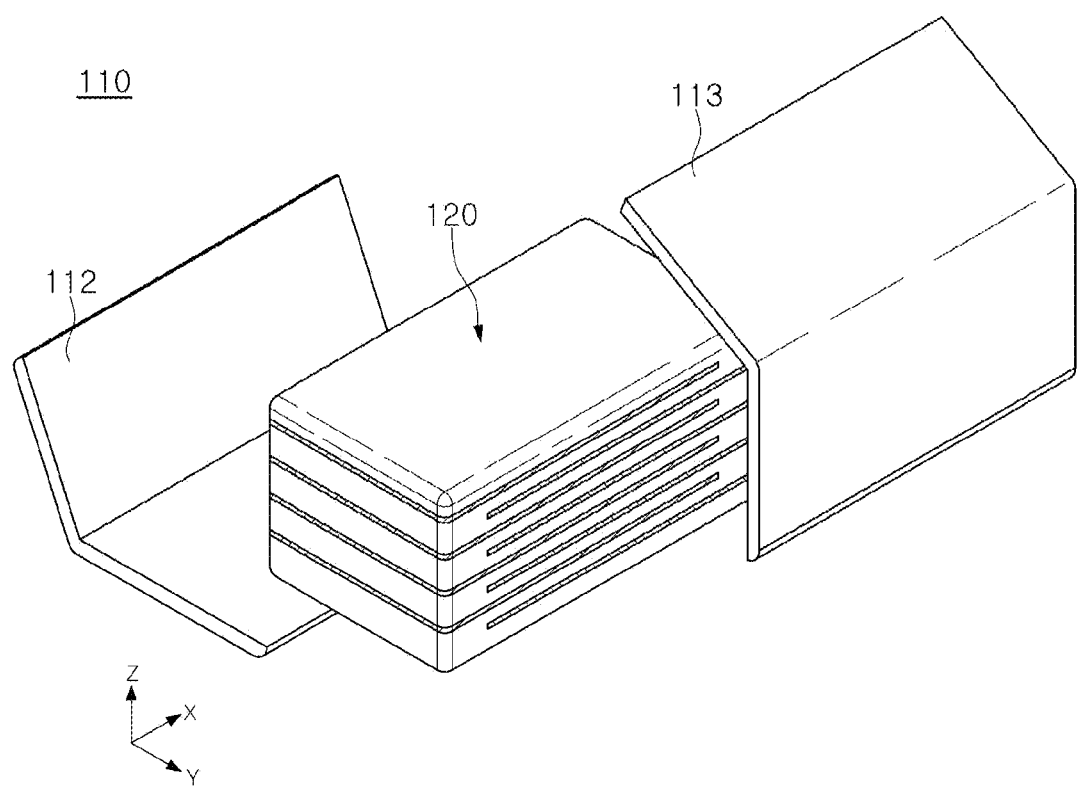
FIG. 13 is a perspective view schematically illustrating a portion of a process of manufacturing the multilayer ceramic electronic component of FIG. 1.

A method of forming a margin portion of the multilayer ceramic electronic component 100 according to an embodiment is not particularly limited, but the margin portion may be formed by, for example, by attaching a ceramic sheet for forming the first margin portion 113 and a ceramic sheet for forming the second margin portion 112. FIG. 13 is a schematic diagram schematically illustrating a method of manufacturing the multilayer ceramic electronic component 100 according to an exemplary embodiment. Referring to FIG. 13, a method, in which after forming the capacitance formation portion 120 first, two ceramic sheets forming the first margin portion 113 and the second margin portion 112 may be attached to the capacitance formation portion 120, may be used. The first and second margin portions 113 and 112 may be formed by fixing the capacitance formation portion 120 to a jig or the like and then transferring the ceramic sheet, but the method is not limited thereto. In one example, prior to forming first and second margin portions 113 and 112, the capacitance formation portion 120 is formed at least through a dicing process to expose the first and second internal electrodes 121 and 122 from the third and fourth surfaces S3 and S4.

In the multilayer ceramic electronic component 100 according to an exemplary embodiment, a first external electrode 131 and a second external electrode 132 may be disposed on an outer surface of the ceramic body 110. The first external electrode 131 may be connected to the first internal electrode 121, and the second external electrode 132 may be connected to the second internal electrode 122.

The first external electrode 131 and the second external electrode 132 may be plastic electrodes including a conductive metal and glass. The conductive metal may include one or more of, for example, nickel (Ni), copper (Cu), tin (Sn), palladium (Pd), platinum (Pt), iron (Fe), gold (Au), silver (Ag), tungsten (W), titanium (Ti), lead (Pb), and alloys thereof. The glass may be a composition in which oxides are mixed, and may be at least one selected from the group consisting of silicon oxide, boron oxide, aluminum oxide, transition metal oxide, alkali metal oxide, and alkaline earth metal oxide, although not particularly limited. The transition metal may be selected from the group consisting of zinc (Zn), titanium (Ti), copper (Cu), vanadium (V), manganese (Mn), iron (Fe) and nickel (Ni), and the alkali metal may be selected from the group consisting of lithium (Li), sodium (Na) and potassium (K), and the alkaline earth metal may be at least one selected from the group consisting of magnesium (Mg), calcium (Ca), strontium (Sr) and barium (Ba).

As an example of a method of forming the first external electrode 131 and the second external electrode 132, the first external electrode 131 and the second external electrode 132 may be formed by dipping the ceramic body 110 in a conductive paste containing a conductive metal to then be sintered, or may be formed by printing and sintering the conductive paste on the surface of the ceramic body 110 by a screen printing method or a gravure printing method. In addition, a method of applying the conductive paste to the surface of the ceramic body 110 or transferring a dried film obtained by drying the conductive paste onto the ceramic body 110 and then sintering the same may be used, but is not limited thereto. For example, in various methods other than the above method, a conductive paste may be formed on the ceramic body 110 and then be sintered.

In an example, the multilayer ceramic electronic component 100 according to an embodiment may further include plating layers disposed on the first external electrode 131 and the second external electrode 132, respectively. The plating layer may include at least one selected from the group consisting of copper (Cu), nickel (Ni), tin (Sn), palladium (Pd), platinum (Pt), gold (Au), silver (Ag), tungsten (W), titanium (Ti), lead (Pb) and alloys thereof, but the material thereof is not limited thereto. The plating layer may be formed of a single layer or a plurality of layers, and may be formed by sputtering or electrolytic plating, but the formation method is not limited thereto.

As set forth above, according to an exemplary embodiment, moisture resistance reliability of a multilayer ceramic electronic component may be improved.

In addition, mechanical strength of the multilayer ceramic electronic component may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer ceramic electronic component comprising:
    a ceramic body including a dielectric layer and a first internal electrode and a second internal electrode disposed to face each other with the dielectric layer interposed therebetween;
    a first external electrode connected to the first internal electrode; and a second external electrode connected to the second internal electrode, wherein the ceramic body includes a capacitance formation portion having a first surface and a second surface opposing each other in a first direction, a third surface and a fourth surface opposing each other in a second direction, and a fifth surface and a sixth surface opposing each other in a third direction, the capacitance formation portion including the first internal electrode and the second internal electrode stacked in the third direction to form capacitance, the ceramic body including a first margin portion disposed on the third and fifth surfaces of the capacitance formation portion and a second margin portion disposed on the fourth and sixth surfaces of the capacitance formation portion and differentiated from the first margin portion.

2. The multilayer ceramic electronic component of claim 1, wherein the first margin portion is disposed in contact with the third and fifth surfaces of the capacitance formation portion, and the second margin portion is disposed in contact with the fourth and sixth surfaces of the capacitance formation portion.

3. The multilayer ceramic electronic component of claim 1, wherein the first margin portion and the second margin portion respectively have a single structure.

4. The multilayer ceramic electronic component of claim 1, comprising a first interface and a second interface disposed in a region in which the first and second margin portions are in contact with each other.

5. The multilayer ceramic electronic component of claim 4, wherein the first interface is disposed on the same plane as the third surface of the capacitance formation portion, and the second interface is disposed on the same plane as the fourth surface of the capacitance formation portion.

6. The multilayer ceramic electronic component of claim 1, wherein the first margin portion extends continuously from the third surface to the fifth surface to cover an edge at which the third surface and the fifth surface of the capacitance formation portion meet each other, and the second margin portion extends continuously from the fourth surface to the sixth surface to cover an edge at which the fourth surface and the sixth surface of the capacitance formation portion meet each other.

7. The multilayer ceramic electronic component of claim 1, wherein a maximum value of a width of the first and second margin portions in the second direction is greater than a maximum value of a vertical distance between the third and fourth surfaces of the capacitance formation portion.

8. The multilayer ceramic electronic component of claim 1, wherein a thickness deviation ($|a-b|/a$) of an average thickness (b) of the first margin portion disposed on the fifth surface of the capacitance formation portion with respect to an average thickness (a) of the first margin portion disposed on the third surface of the capacitance formation portion is 5% or less.

9. The multilayer ceramic electronic component of claim 1, wherein a thickness deviation ($|c-d|/c$) of an average thickness (d) of the second margin portion disposed on the sixth surface of the capacitance formation portion with respect to an average thickness (c) of the second margin portion disposed on the fourth surface of the capacitance formation portion is 5% or less.

10. The multilayer ceramic electronic component of claim 1, wherein the first margin portion and the second margin portion have different average densities.

11. The multilayer ceramic electronic component of claim 1, wherein each of the first and second margin portions includes dielectric grains, wherein an average particle diameter of dielectric grains in the first margin portion and an average particle diameter of dielectric grains in the second margin portion are different.

12. The multilayer ceramic electronic component of claim 1, wherein each of the first and second margin portions includes magnesium (Mg), wherein a content of magnesium (Mg) in the first margin portion and a content of magnesium (Mg) in the second margin portion are different.

13. The multilayer ceramic electronic component of claim 1, wherein an average density of an outermost dielectric layer of the capacitance formation portion in the third direction is different from an average density of the first margin portion disposed on the third surface of the capacitance formation portion.

14. The multilayer ceramic electronic component of claim 1, wherein the dielectric layer of the capacitance formation portion and the first margin portion each include dielectric grains, and an average particle diameter of the dielectric grain of an outermost dielectric layer of the capacitance formation portion in the third direction is different from an average particle diameter of the dielectric grain of the first margin portion disposed on the third surface of the capacitance formation portion.

15. The multilayer ceramic electronic component of claim 1, wherein the first margin portion is disposed together in contact with one surfaces of the capacitance formation portion and one surfaces of the second margin portion in the second direction and in the third direction.

16. The multilayer ceramic electronic component of claim 1, wherein a second direction-third direction cross section of the first margin portion and/or the second margin portion has an L-shape.

17. The multilayer ceramic electronic component of claim 1, wherein an average thickness of the first margin portion and/or the second margin portion ranges from 10 μm or more to 25 μm or less.

18. A multilayer ceramic electronic component comprising;

a ceramic body including a dielectric layer, and a first internal electrode and a second internal electrode disposed to face each other with the dielectric layer interposed therebetween;

a first external electrode connected to the first internal electrode; and a second external electrode connected to the second internal electrode, wherein the ceramic body includes a capacitance formation portion having first and second surfaces opposing each other in a first direction, third and fourth surfaces opposing each other in a second direction, and fifth and sixth surfaces opposing each other in a third direction, the capacitance formation portion including the first and second internal electrodes stacked in the third direction to form capacitance, the ceramic body including a first margin portion disposed on the third and fifth surfaces and a second margin portion disposed on the fourth and sixth surfaces.

19. The multilayer ceramic electronic component of claim 18, wherein the first margin portion is disposed in contact with the third and fifth surfaces of the capacitance formation portion, and the second margin portion is disposed in contact with the fourth and sixth surfaces of the capacitance formation portion.

20. The multilayer ceramic electronic component of claim 19, wherein a portion of the first margin portion is disposed in contact with the third and fifth surfaces of the capacitance formation portion, and a remaining portion of the first margin portion extends to the first and second surfaces of the capacitance formation portion, and a portion of the second margin portion is disposed in contact with the fourth and sixth surfaces of the capacitance formation portion simultaneously, and a remaining portion of the second margin portion extends to the first and second surfaces of the capacitance formation portion.

21. The multilayer ceramic electronic component of claim 19, wherein the first margin portion is disposed in contact with a surface of the second margin portion in the second direction, a surface of the second margin portion in the third direction, and the capacitance formation portion.

22. The multilayer ceramic electronic component of claim 19, wherein the first margin portion is disposed in contact with the first internal electrode or the second internal electrode disposed on the fifth surface of the capacitance formation portion.

23. The multilayer ceramic electronic component of claim 19, wherein the second margin portion is disposed in contact with the first internal electrode or the second internal electrode disposed on the sixth surface of the capacitance formation portion.

24. The multilayer ceramic electronic component of claim 19, wherein a second direction-third direction cross section of the first margin portion and/or the second margin portion has an L shape.

25. A multilayer ceramic electronic component comprising:

a ceramic body including a dielectric layer and a first internal electrode and a second internal electrode disposed to face each other with the dielectric layer interposed therebetween;

a first external electrode connected to the first internal electrode; and a second external electrode connected to the second internal electrode, wherein the ceramic body includes a capacitance formation portion having a first surface and a second surface opposing each other in a first direction, a third surface and a fourth surface opposing each other in a second direction, and a fifth surface and a sixth surface opposing each other in a third direction, the capacitance formation portion including the first internal electrode and the second internal electrode stacked in the third direction to form capacitance, the ceramic body includes margin portions disposed on third to sixth surfaces, and in a second direction-third direction cross section, interfaces between the margin portions are disposed only at two diagonal corners of the ceramic body.

26. The multilayer ceramic electronic component of claim 25, wherein a thickness deviation (|a−b|/a) of an average thickness (b) of a portion of the margin portions disposed on one of the third to sixth surfaces with respect to an average thickness (a) of a portion of the margin portions disposed on another of the third to sixth surfaces is 5% or less, and the one of the third to sixth surfaces and the another of the third to sixth surfaces provide a corner of the ceramic body different from the two diagonal corners.

27. The multilayer ceramic electronic component of claim 25, wherein the margin portions are differentiated from a dielectric material of the capacitance formation portion.

28. The multilayer ceramic electronic component of claim 25, comprising interfaces between the capacitance formation portion and the margin portions.

29. The multilayer ceramic electronic component of claim 25, wherein in the second direction-third direction cross section, the margin portions include a first L-shaped margin portion and a second L-shaped margin portion connected to the first L-shaped margin portion.

30. A method for manufacturing a multilayer ceramic electronic component, the method comprising:

forming a capacitance formation portion having a first surface and a second surface opposing each other in a first direction, a third surface and a fourth surface opposing each other in a second direction, and a fifth surface and a sixth surface opposing each other in a third direction, the capacitance formation portion including the first internal electrode and the second internal electrode stacked in the third direction to form capacitance;

simultaneously forming a first margin portion on the third surface and the fifth surface;

simultaneously forming a second margin portion on the fourth surface and the sixth surface;

forming a first external electrode to connect to the first internal electrode; and forming a second external electrode to connect to the second internal electrode.

31. The method claim 30, wherein the first margin portion and the second margin portion are formed one after another.

32. The method claim 30, wherein each of the first and second margin portions is formed by transferring a ceramic sheet onto the capacitance formation portion.

33. The method of claim 30, wherein a thickness deviation (|a−b|/a) of an average thickness (b) of the first margin portion formed on the fifth surface of the capacitance formation portion with respect to an average thickness (a) of the first margin portion formed on the third surface of the capacitance formation portion is 5% or less.

34. The method of claim 30, wherein a thickness deviation (|c−d|/c) of an average thickness (d) of the second margin portion formed on the sixth surface of the capacitance formation portion with respect to an average thickness (c) of the second margin portion formed on the fourth surface of the capacitance formation portion is 5% or less.

* * * * *